(12) United States Patent
Govande et al.

(10) Patent No.: US 9,723,461 B2
(45) Date of Patent: Aug. 1, 2017

(54) SYSTEMS AND METHODS FOR CONTEXT BASED AND SOCIALLY AWARE CALL ROUTING

(71) Applicant: PayPal, Inc., San Jose, CA (US)

(72) Inventors: Shailesh Dinkar Govande, Milpitas, CA (US); Madhura Pravin Tipnis, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 19 days.

(21) Appl. No.: 14/188,329

(22) Filed: Feb. 24, 2014

(65) Prior Publication Data
US 2015/0245184 A1 Aug. 27, 2015

(51) Int. Cl.
*H04W 4/16* (2009.01)
*H04M 3/54* (2006.01)

(52) U.S. Cl.
CPC .............. *H04W 4/16* (2013.01); *H04M 3/54* (2013.01); *H04M 2203/655* (2013.01); *H04M 2242/28* (2013.01)

(58) Field of Classification Search
CPC ............ H04W 4/06; H04W 4/16; H04M 3/54
USPC ................................... 455/417, 445
See application file for complete search history.

(56) References Cited

U.S. PATENT DOCUMENTS

| | | | |
|---|---|---|---|
| 2005/0215243 A1* | 9/2005 | Black et al. ................ | 455/417 |
| 2007/0195793 A1* | 8/2007 | Grosser et al. .......... | 370/395.53 |
| 2009/0116443 A1* | 5/2009 | Walker et al. ............... | 370/329 |
| 2009/0280787 A1* | 11/2009 | Chavez et al. ............. | 455/417 |
| 2011/0069825 A1* | 3/2011 | Rogson .................. | 379/142.06 |
| 2013/0150097 A1* | 6/2013 | Chou et al. .................. | 455/466 |
| 2013/0210393 A1* | 8/2013 | Hillier ................... | H04W 4/021 455/413 |
| 2014/0065997 A1* | 3/2014 | Walker ..................... | H04W 4/02 455/404.1 |

\* cited by examiner

*Primary Examiner* — Christopher M Brandt
(74) *Attorney, Agent, or Firm* — Haynes and Boone, LLP

(57) ABSTRACT

When a telephone call is made to a user with a cellular telephone that has weak or no wireless signal receptions, the telephone call may be re-routed to another telephone located near the user, such that the telephone call may reach the user via another telephone. A system or method is provided to determine an alternate telephone, to which the telephone call is re-routed when the primary receiving telephone is a cellular phone that has weak or no wireless signal reception. The alternate telephone may be determined in a context and/or social aware basis. The alternate telephone may belong to a friend or family member of the user of the primary receiving telephone. Further, the alternate telephone may be located near the user of the primary receiving telephone, such that the user of the primary receiving telephone may be reached when the telephone call is re-routed to the alternate telephone.

22 Claims, 4 Drawing Sheets

SYSTEMS AND METHODS FOR CONTEXT BASED AND SOCIALLY AWARE CALL ROUTING

BACKGROUND

Field of the Invention

The present invention generally relates to systems and methods for context based and socially aware call routing.

Related Art

With the proliferation of mobile devices, an increasing number of telephone calls are made via wireless cellular telephones. The quality of calls for a cellular telephone depends mainly on the strength of wireless signal reception between the cellular telephone and a cellular tower that connects the cellular telephone to the telephone network. When the cellular telephone is in a location where wireless signal is weak, the cellular telephone may experience call drops or deterioration in call quality. Thus, there is a need for a system or method that facilitates cellular phone calls when the cellular phone is in an area where wireless signals are weak or are not available.

Figure 1:
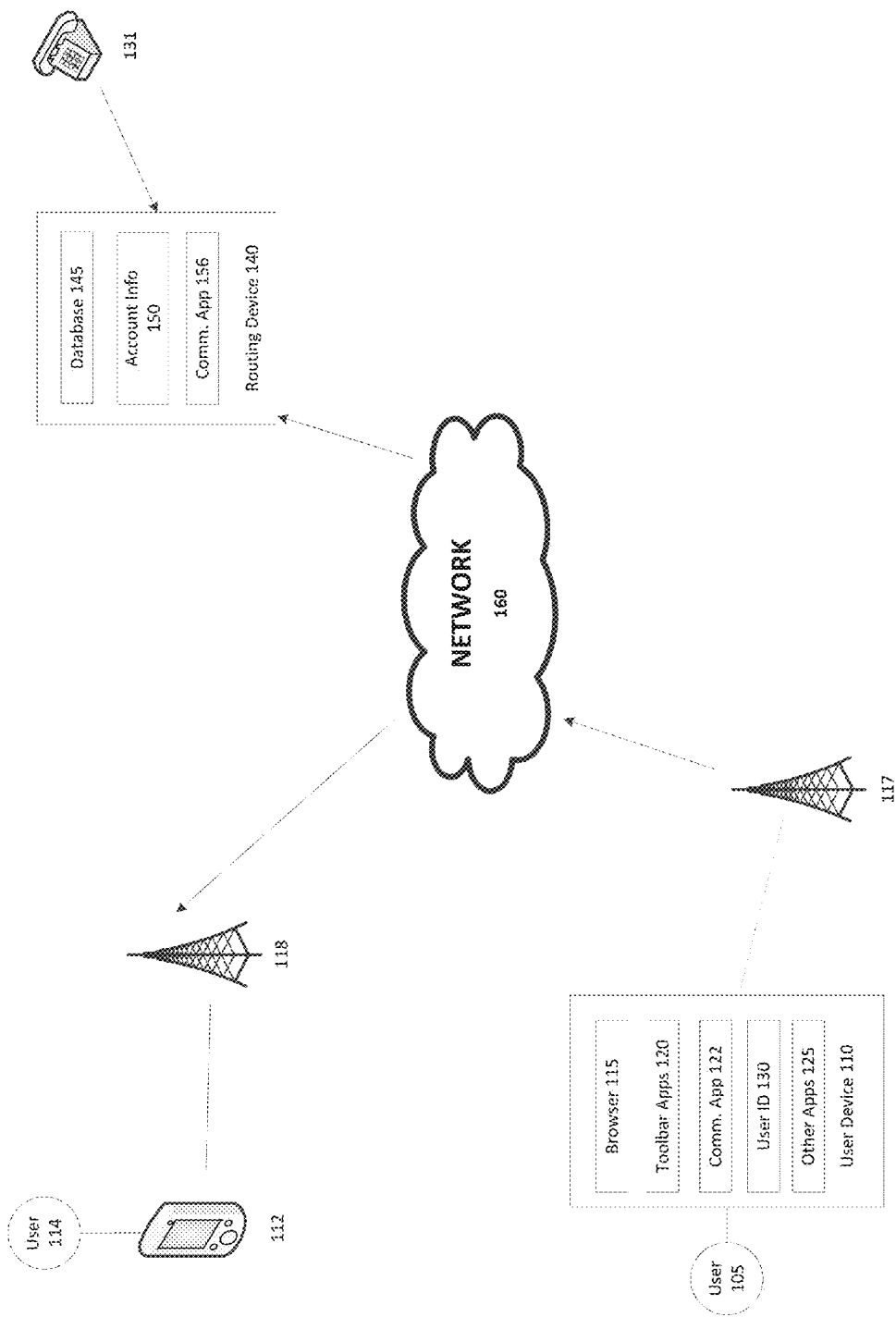
FIG. 1 is a block diagram of a networked system suitable for implementing a process for facilitating call routing according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, when a telephone call is made to a user with a cellular telephone that has weak or no wireless signal reception, the telephone call may be re-routed to an alternate phone located near the user, such that the telephone call may reach the user via the alternate phone. In particular, a system or method is provided to determine an alternate telephone, to which the telephone call is re-routed when the primary receiving telephone is a cellular phone that has weak or no wireless signal reception. The alternate telephone may be determined in a contextual and/or social aware basis. For example, the alternate telephone may belong to a friend or family member of the user of the primary receiving telephone. Further, the alternate telephone may be located near the user of the primary receiving telephone, such that the user of the primary receiving telephone may be reached when the telephone call is re-routed to the alternate telephone.

In an embodiment, the system may allow a user to designate who may use the user's telephone as an alternate telephone for call re-routing. For example, the user may designate friends in a social network, family members, co-workers, or the like as a group who may use the user's telephone as an alternate telephone for call rerouting. Thus, when a telephone call is not able to reach a designated friend of the user and the designated friend is near the user, the telephone call may be rerouted to the user's telephone and the user may allow the designated friend to use the user's telephone to answer the call.

In an embodiment, the system may determine the alternate telephone for call re-routing based on contextual information, such as the identity of the caller, time, place, and etc. In particular, the system may perform call re-routing when it is convenient for the original call receiver to reach the alternate telephone. For example, the system may avoid call re-routing when the call receiver or the user of the alternate telephone is in a business meeting. In another example, the system may avoid re-routing calls through people who may have animosity toward the call receiver, such as ex-boyfriends or ex-spouses.

FIG. 1 is a block diagram of a networked system 100 suitable for implementing a process for routing telephone calls according to an embodiment. Networked system 100 may comprise or implement a plurality of communication devices, servers, and/or software components that operate to perform various telephone communications. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a routing device 140, phone devices 112 and 131, and cellular towers 117 and 118 in communication over network 160. A user 105 may utilize user device 110 to perform telephone communication via network 160. A user 105 may utilize user device 110 to initiate and receive telephone calls. Similarly, user 114 may use telephone device 112 to initiate and receive telephone calls.

A routing device 140 may be operated by a telecommunication service provider. Routing device 140 may be configured to route telephone calls based on a dialed telephone number from a call-initiating telephone device to a call-receiving telephone device. The phone call may be routed through network 160. Network 160 may be a Public Switch Telephone Network (PSTN) including various telephone lines, fiber optic cables, cellular networks, communication satellites connected by switching/routing centers. In some embodiments, network 160 may include an Internet Protocol (IP) network configured to facilitate Voice over IP (VoIP) communications.

A telephone call may be initiated from telephone device 131. For example, a user may dial a phone number of user device 110 at telephone device 131. Thus, the telephone call may be designated for user device 110. Routing device 140 may receive the call request and may route the telephone call through network 160 to user device 110. In particular, user device 110 is within the cellular area of cellular tower 117 and is connected to cellular tower 117. Thus, the telephone call from telephone device 131 may be routed to user device 110 via cellular tower 117.

User device 110, routing device 140, telephone devices 112 and 131 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication in the system 100. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over network 160, such as a user account for setting up a shopping list and/or merchant sites for viewing and purchasing products and services. User device 110 may also include one or more toolbar applications 120 which may be used, for example, to provide client-side processing for performing desired tasks in response to operations selected by the user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160. User device 110 includes one or more user identifiers 130 which may be implemented, for example, as operating system registry entries, cookies associated with browser application 115, identifiers associated with hardware of user device 110, telephone number associated with user device 110 or other appropriate identifiers, such as used for payment/user/device authentication. In one embodiment, user identifier 130 may be used by a telephone communication service provider to associate user 105 with a particular telephone account maintained by the telephone communication service provider.

User device 110 may include a communications application 122, with associated interfaces, enables user device 110 to communicate within system 100. For example, the communications application 112 may be configured to manage and implement wired communication, such as Ethernet communication and/or telephone landline communication, and wireless communication, such as WiFi communication, Bluetooth communication, cellular voice and/or data communication, Near-Field Communication (NFC), and the like.

User device 110 also may include applications that collect location data using Global Positioning System (GPS) to identify a location of user device 110. User device 110 may have a magnetometer configured to detect a moving or traveling direction of user device 110. Other means for collecting location data, such as WiFi devices, Near-Field Communication (NFC) devices, or the like also may be included in user device 110 for determining a location of user device 110. Thus, user device 110 may determine a current location of user device 110 and track a traveling direction of the user device 110 based on the collected location data.

Routing device 140 may be maintained, for example, by a telecommunication service provider. Routing device 140 may be configured to receive telephone call requests and route telephone calls to a receiving device based on a telephone number entered by the caller. Routing device 140 may be configured to route VoIP or PSTN telephone calls.

Routing device 140 may include a database 145 identifying various connections of network 160, which may be used for routing telephone calls. For example, database 145 may include a topology of network 160 for the purpose of routing calls from callers to call receivers. Database 145 may also include an area code v. geographical location table, which maps area codes or prefixes of telephone numbers to their respective geographical location.

Routing device 140 may store or have access to account information 150. Account information 150 may include account information of various telephone accounts. Account information may include telephone number, registered user, type of device associated with the telephone account, telephone service plan, and various user settings. In particular, account information may include call re-routings settings indicating how a call is to be re-routed when a call receiving device cannot be reached.

Call re-routing settings may define conditions under which a call is to be re-routed. For example, when a cellular device's signal reception is below a certain level, call re-routing may be implemented. Call re-routing settings also may define alternate devices through which a call is to be re-routed. For example, a user may link his/her social network account with his/her telephone account and allows calls to be re-routed through friends on his/her social network. Call re-routing settings also may include other conditions in which call re-routing should be implemented. For example, time and/or place may be designated for allowing call re-routing. Call re-routing settings may be set by the originally intended call recipient and/or the users to which a call is re-routed to.

Routing device 140 may include a communications application 156, with associated interfaces, enables routing device 140 to communicate within system 100. For example, the communications application 156 may be configured to manage and implement wired communication, such as Ethernet communication and/or telephone landline communication, and wireless communication, such as WiFi communication, Bluetooth communication, cellular voice and/or data communication, Near-Field Communication (NFC), and the like.

Cellular towers 117 and 118 may be operated by one or more telecommunication service providers. Cellular towers 117 and 118 may be configured to manage communication for cellular telephone devices located within the cellular tower 117's and 118's respective broadcast ranges. Cellular towers 117 and 118 may have access to network 160 and may provide internet and/or telephone services to cellular devices within their respective broadcast ranges. Telephone device 112 may be located within the broadcast range of cellular tower 118 and configured to facilitate cellular or data communication with cellular tower 118. Thus, communication device 112 may initiate and/or receive telephone calls by connecting to the cellular tower 118. User device 105 may be connected to cellular tower 117, but may have a weak signal reception from cellular tower 117 as indicated by dashed arrow. When a phone call is initiated to reach user device 110, user device 110 may have low quality or no connection to the phone call. Routing device 140 may determine that telephone device 112 is located near user device 110 and that user 105 of user device 110 allows for call re-routing via telephone device 112. Thus, routing device 140 may re-route the call to telephone device 112. User 114 may hand telephone device 112 to user 105 to answer the call intended for user 105, which is re-routed via telephone device 112.

Figure 2:
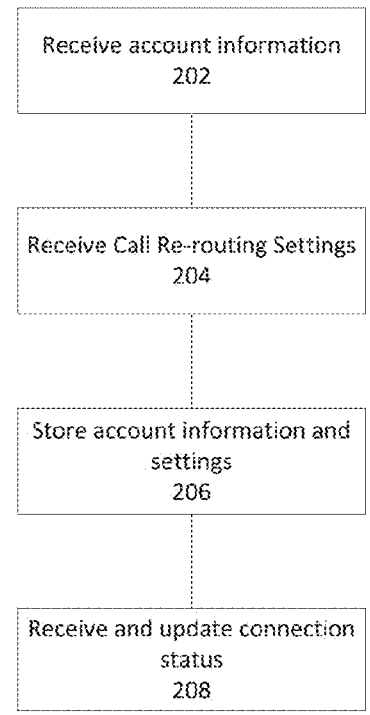
FIG. 2 is a flowchart showing a process for receiving account information for call routing according to one embodiment.

FIG. 2 is a flowchart showing a process 200 for receiving account information for call routing according to one embodiment. At step 202, routing device 140 may receive telephone account information. For example, when a new telephone account is set up, the telephone account may be registered at routing device 140. Telephone account information may include telephone number assigned to a telephone device, user information, service plan information, voice mail settings, telephone device type and model, re-routing settings and preferences. Re-routing settings may include parameters for determining which calls to the telephone device should be rerouted and which calls to another device should be rerouted to the telephone device.

At step 204, routing device 140 may receive re-routing settings. For example, a user input interface may be provided at user device 110 to receive user input for re-routing settings for the telephone account associated with user device 110. The re-routing settings may include telephone numbers of other phone devices that are allowed to serve as alternate phones to receive phone calls intended for user device 110. For example, user 105 may allow phone devices of friends and family members to serve as alternate phones to receive telephone calls intended for user device 110 when user device 110 has weak or no wireless signal reception and is not able to receive telephone calls. User 105 may enter telephone numbers of friends and family members to the list of alternate phone devices in the re-routing settings.

The re-routing settings may also include telephone numbers of other phone devices that are allowed to use user device 110 as an alternate phone to receive telephone calls for other phone devices. For example, user 105 may allow phone calls intended for friends or family members to be forwarded to user device 110 when the phone devices of the friends or family members have weak or no wireless signal receptions. User 105 may enter telephone numbers of friends and family members to the call forward allow list in the re-routing settings.

In addition to specifying phone numbers, re-routing settings may also include condition or parameters, such as only reroute or do not reroute at certain times, certain locations, certain days, certain area codes of the initiating calling device, within a certain distance from the user, etc. For example, when the intended call recipient is at work during business hours, calls may not be re-routed to the intended call recipient. In another example, call from certain area codes indicating telemarketers may be prohibited from being re-routed to the intended call recipient.

In some embodiments, phone devices that are allowed to receive phone calls for user 105 also are allowed to forward calls to user 105. Thus, the list of alternate phone devices and the call forward allow list may have the same phone numbers. In some embodiments, the lists may be different, because certain devices may be allowed to receive phone calls for user device 110, but may not be allowed to use user device 110 as an alternate phone for receiving phone calls, and vice versa.

In an embodiment, the system may allow user 105 to associate the telephone account with a social networking account or a contact list of user 105. Thus, telephone numbers of friends from the social networking account or the contact list may be downloaded to the telephone account to be used as alternate phones or be allowed to use user device 110 as an alternate phone. In some embodiments, user 105 may allow all telephone numbers from the social networking account or the contact list to serve as alternate phones or use user device 110 as an alternate phone. In this case, user 105 may setup a list of blocked phone numbers that are not allowed for such arrangement. Thus, user 105 may designate a blocked list of people that have animosity toward user 105, e.g., ex-girlfriend or ex-spouse, that are not allowed to use user device 110 to receive calls or serve as alternate phone to receive calls for user 105.

The re-routing settings also allow user 105 to set a degree of call forwarding. For example, when a call intended for user 105 cannot be made, the system may attempt to find an alternate phone designated by user 105 to receive the call intended for user 105. However, if none of the alternate phones designated by user 105, e.g., first degree alternate phones, are available, the system may search for alternate phones of the first degree alternate phones. The alternate phones of the first degree alternate phones may be second degree alternate phones. Thus, even if none of user 105's first degree alternate phones are available, the system may continue to search for second degree alternate phones for any available alternate phones near user 105. The system may allow user 105 to set how many degrees of call forwarding is allowed, e.g., 1, 2, 3, and etc. In particular, user 105 may set the maximum degree of alternate phones that are allowed to receive phone calls intended for user 105. Further, user 105 may set the maximum degree of phones that are allowed to use user 105's phone as alternate phone to receive phone calls.

The re-routing settings may allow user 105 to set time and/or locations where call re-routing is allowed. For example, call re-routing may be prohibited when user device 110 is in a silence mode. Call re-routing also may be prohibited when user 105 is at work or during time of resting. In some embodiments, the system may access user 105's calendar and may determine when call routing is allowed. For example, based on user 105's calendar, call routing may be prohibited during a scheduled meeting on the calendar. Thus, during these prohibited times, calls made to user device 110 may not be re-routed and user device 110 may not serve as an alternate phone for receiving re-routed calls. As such, user 105 may not be distracted by re-routed calls.

The re-routing settings may include callers whose calls are allowed to be re-routed when user device 110 is not available. For example, user 105 may designate user 105's family members as callers whose calls are allowed to be re-routed when user 105's user device 110 has bad connection. Thus, when one of user 105's family member is attempting to call user 105 and user device 110 has weak or no connection, the calls from the family member may be re-routed to an alternate phone located near user 105, such that user 105 may be reached by the family member via the alternate phone. On the other hand, when a non-family member, such as a telemarketer, attempts to call user 105, the call may not be re-routed to an alternate phone, because calls from the telemarketer are not allowed to be re-routed to user 105. Thus, user 105 may not be harassed by non-family members, such as the telemarketers.

At step 206, routing device 140 may store the account information including the re-routing settings. The account information may be associated with user 105's account. Routing device 140 may store a plurality of user accounts each with its account information and re-routing settings. Thus, the system may coordinate call rerouting among different telephone accounts based on the respective re-routing settings of the telephone accounts.

At step 208, routing device 130 may receive and update connection status of telephone devices. For landline telephone devices, the connection status of a telephone device may be determined by calls previously made to the telephone device. In some embodiments, test calls may be made to the landline telephone device to determine the connections status of the landline telephone device. Further, the geographical location of a landline telephone device also may be received when the user of the geographical location sets up the account for the landline telephone device. For example, the address where the landline telephone is installed may be entered by the user during registration of the telephone account. Thus, the geographical location of the landline telephone device may be received by the system.

For VoIP telephones, the connection status of a VoIP telephone device may be determined by calls previously made to the VoIP telephone device. In some embodiments, test data packets may be sent to the VoIP telephone to determine the connection status of the VoIP telephone. The geographical location of the VoIP telephone may be received when the VoIP telephone is registered. For example, the address where the VoIP telephone may be entered by the user during registration. In an embodiment, the geographical location of the VoIP telephone may be determined based on the location of the IP network the VoIP is connected to.

For wireless telephones, the connection status of a wireless telephone may be determined by signal strengths between the wireless telephone and the cellular tower where the wireless telephone is connected to. For example, the cellular tower may send the connection status of the wireless telephone to routing device 140. The connection status may indicate a level of signal strength between the cellular tower and the wireless telephone, type of connection, e.g., GSM, CDMA, 3G, LTE, or etc. Some wireless telephones may implement both wireless voice phone calls and VoIP phone calls. Thus, the connections status for both types of telephone calls may be forwarded to routing device 140. The geographical location of the wireless telephone may be detected by a Global Positioning System ("GPS") installed at the wireless telephone. Other manners for detecting the location of the wireless telephone also may be implemented, such as signals detected by Bluetooth beacons, Near-Field Communication (NFC), or etc. Thus, the location of the wireless telephone may be determined and sent to routing device 140.

Accordingly, routing device 140 may receive information regarding the connection status and the locations of various telephone devices. The connection status and the locations of various telephone devices may continuously be updated. Routing device 140 may use the connection status and locations of the telephone devices to implement re-routing of phone calls.

Figure 3:
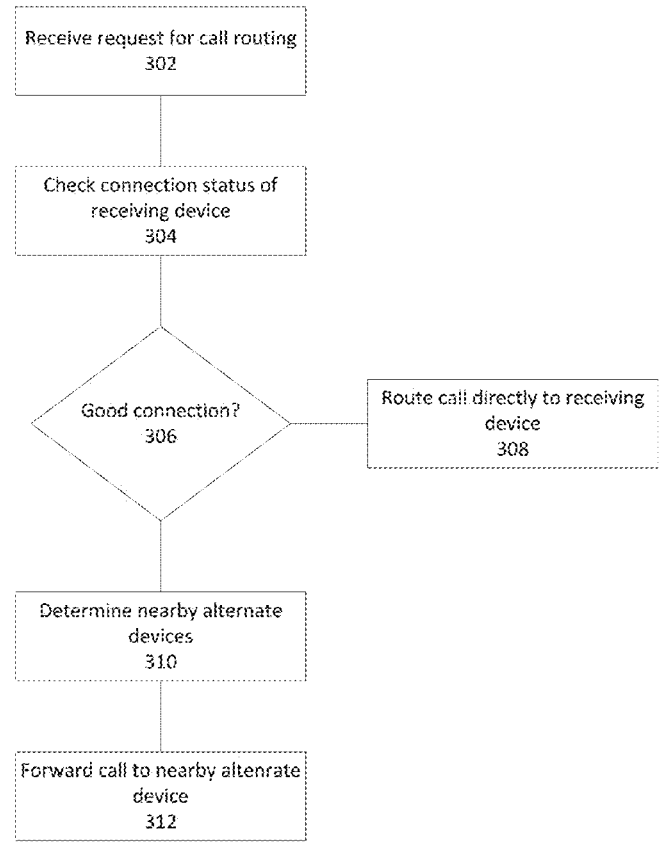
FIG. 3 is a flowchart showing a process for call routing according to one embodiment.

FIG. 3 is a flowchart showing a process 300 for call routing according to one embodiment. At step 302, routing device 140 may receive a request for call routing. For example, a call may be initiated from telephone device 131 by entering a telephone number of user device 110, which is the intended call receiver. Routing device 140 may receive the call request from telephone device 131. In some embodiments, routing device 140 may receive the call request from another routing device. The request may include the telephone number of the intended call receiver.

At step 304, routing device 140 may check the connection status of the intended call receiving device. As noted above in step 208, the connection status of telephone devices may continuously be updated. Thus, routing device 140 may reference the connection status of the intended call receiving phone device. In some embodiments, the connection status of the intended call receiving device may be determined by attempting to connect the call to the intended call receiving device. For example, routing device 140 may route the call to user device 110 to check whether the call can be connected.

At step 306, routing device 140 may determine whether a good connection is available to route the call to the intended call receiving device, based on the connection status of the intended call receiving device. For a wireless phone device as the intended call receiver, the connection may be good when the strength of signal reception of the wireless phone device is above a certain threshold. The connection may be bad when the strength of signal reception of the wireless phone device is below a certain threshold for a certain period of time. The threshold may be adjusted by the user in the call re-routing settings. For example, routing device may determine whether there is a good connection to user device 110 based on the strength of signal reception between user device 110 and cellular tower 117. When the signal strength is below a certain threshold, routing device 110 may determine that there is bad connection to user device 110.

In some embodiments, routing device 110 may determine that there is bad connection to the intended call receiver when an attempted call to the intended call receiver has failed. In another embodiment, after the call has been connected to the intended call receiver, either the user of the intended call receiver or the caller may indicate that the call quality is bad. For example, after the call between phone device 131 and user device 110 is connected, user 105 may indicate to routing device 140 that the call connection is bad. A user interface may be provided on user device 110 for user to indicate that the call quality is unacceptable and that call re-routing is needed.

If the connection is good at step 306, routing device 110 may route the call directly to receiving device or continue the connection to the receiving device at step 308. For example, as shown in FIG. 1, if user device 110 has good connection to cellular tower 117, routing device 140 may route the call from phone device 131 directly to user device 110 via network 160. Thus, user 105 may use user device 110 to conduct telephone communication with the user of telephone device 131.

If the connection is not good at step 306, routing device 140 may determine a nearby alternate device at step 310. Routing device 140 may search in the list of phones which are allowed to serve as alternate phones for receiving calls for the intended receiving device. In particular, the alternate phones that have good connection and are located near the intended call receiving device may be determined.

The alternate phones located near the intended call receiving device may be determined based on their respective geographical locations detected via GPS or other positioning techniques. In some embodiments, the nearby alternate phones may be determined using NFC signals, such as Bluetooth. For example, when the intended call receiving device is experiencing low or no signal reception from the cellular tower, the intended call receiving device may send out Bluetooth signals to nearby alternate phones indicating that the intended call receiving device may need them to serve as alternate phones to receive phone calls for the intended call receiving device. These alternate phones may receive the Bluetooth signals from the intended call receiving device and may notify routing device 140 that they are available to receive calls for the intended call receiving device. Thus, when the intended call receiving device is called, nearby alternate phones may be ready to receive calls for the intended call receiving device.

For example, as shown in FIG. 1, when user device 110 is experiencing weak or no signal reception from cellular tower 117, user device 110 may send out Bluetooth or other NFC signals to search for alternate phones located near user device 110. Phone device 112 may be connected to cellular tower 118 and may have good signal reception from cellular tower 118. Further, phone device 112 may be located near user device 110. Phone device 112 may receive the Bluetooth signal from user device 110 and may notify routing device 140 that phone device 112 may serve as an alternate phone to receive phone calls for user device 110. Thus, when a call is attempted to reach user device 110, routing device 140 may select phone device 112 as an alternate phone located near user device 110 to receive the call for user device 110.

In an embodiment, potential alternate phones located near user device 110 may be determined based on location status from social network accounts. For example, social network services, such as FOURSQURE or FACEBOOK, may allow users to check-in to various destinations, such as restaurants, bars, shops, etc. User 105 may grant the telecommunication system access to user 105's social network account. Thus, the telecommunication system may access the location of user 105 and the locations of user 105's friends via the social network account. Based on the check-in status or location status of friends on the social network, the telecommunication system may determine potential alternate phones located near user 105. For example, via the social network, the telecommunication system may determine that user 105 and two other friends on user 105's social network are currently located at an Italian restaurant. Thus, the mobile phone devices of those two friends may be potential alternate phones that may receive calls of user 105.

When determining nearby alternate phone devices, routing device 140 may consider rules and restrictions as indicated in the call re-routing settings set forth in step 204. For example, the alternate phone devices may be devices listed in the list of alternate phone devices that are allowed to receive phone calls in place of the intended call receiving device. Further, the alternate phone devices may not be in the blocked list of phones that are prohibited from receiving phone calls in place of the intended call receiving device.

When no alternate phones on the intended call receiver's list is available, based on the intended call receiver's call re-routing settings, second, third, or more degree related alternate phones may be searched to find available alternate phones. For example, when no alternate phones on user 105's call forwarding allow list is available, routing device 140 may search alternate phones of alternate phones, and so on, depending on how many degrees of relations are allowed for the call forwarding as set forth in the call re-routing settings.

Routing device 140 also may consider other context, such as the time and place of call. When intended call receiving user is in a meeting or is not available to receive phone calls, routing device 140 may refrain from re-routing the call. For example, routing device 140 may determine, based on user 105's calendar, that user 105 is currently attending a lecture. Thus, routing device 140 may not re-route a call to user 105 or a call for user 105 during the lecture. As such, user device 110 may not serve as an alternate phone for receiving calls for other devices and calls intended for user device 110 also are not re-routed to other devices.

Routing device 140 may select an alternate phone based on proximity to the intended call receiver and the signal strength of the alternate phone. In some embodiments, an interface may be provided for the user of the intended call receiving device to select an alternate phone from a list of potential alternate phones. For example, when the call quality on user device 110 is worsening, selections may be provided on user device 110 to choose to end the call on user device 110 and continue the call on an alternate device. User 105 may choose to end the call on user device 110 and may select from a list of possible alternate phones located near user 105 to continue the call. For example, user 105 may be located in a restaurant, and the list of possible alternate phones may include phone device 112 of user 114, who is currently dining at user 105's table, a public pay phone installed at the restaurant, another mobile phone of user 105's friend dining at the other end of the restaurant. User 105 may select phone device 112 of user 114 as the alternate phone to continue the call. Thus, user 105 may borrow user 114's phone, which is located closest to user 104, to continue the call.

The list of possible alternate phones may be presented to user 105 in the order of proximity to user 105. Other information, such as the signal strength, the type of phone, the relationship of phone owner to user 105, and the like, of each alternate phone may be presented in the list. Thus, user 105 may make appropriate selection for continuing the call. For example, user 105 may select the public pay phone installed in the restaurant to continue the call, such that other users are not distracted.

If no alternate phones are available to receive the call in place of the intended call receiver, routing device 140 may end the call and indicate to the calling party that no connection is available to the intended call receiver. In some embodiments, if no alternate phones are available, routing device 140 may inquire the caller or the intended call receiver whether they would like to attempt a connection without re-routing. For example, if the connection is weak between user device 110 and cellular tower 117 but no other alternate phones are available to re-route the call, routing device 140 may inquire whether user 105 would like to continue the call using user device 110, without re-routing. Thus, even though call quality is bad, user 105 has the option of continuing the call.

If an alternate phone is found to receive the call in place of the intended call receiver, routing device 140 may forward the call to the alternate phone at step 312. The forwarded call may include instructions to the user of the alternate phone that the call is intended for another person. Thus, the user of the alternate phone may be requested to hand the alternate phone to the intended call receiver to answer the call. The instructions may be included in a caller ID display or in an audio prompt when the user of the alternate phone answers the call. For example, as shown in FIG. 1, phone device 112 may serve as an alternate phone for receiving a call for user device 110, which is experiencing bad call quality. Routing device 140 may re-route the call intended for user device 110 to phone device 112. The caller ID for the re-routed call may indicate that phone device 131 is calling and that the call is intended for user device 110. Further, when user 114 answers the call, an audio prompt may state: "Hello, this call is intended for user 105, but is re-routed to you because user 105's phone is experiencing technical difficulty. Please press 1 and deliver the phone to user 105 or press 2 to deny the call re-routing." Thus, user 114 may choose to accept the call for user 105 or deny the call re-routing. If user 114 chooses to accept the call, user 114 may press 1 and hand phone device 112 to user 105.

In some embodiments, the call received at the alternate phone device may be forwarded to the intended receiving device via NFC, such as Bluetooth communication. For example, as shown in FIG. 1, user device 110 and phone device 112 may be connected via NFC, such as Bluetooth. Phone device 112 may serve as an alternate phone for receiving calls for user device 110, because user device 110 is having difficulty connecting to cellular tower 117. When a call is made from phone device 131 and intended for user device 110, routing device 140 may re-route the call to phone device 112. After receiving the call intended for user device 110, phone device 112 may designate a Bluetooth channel to user device 110 for the call. For example, phone device 112 may notify user device 110 via Bluetooth communication that a call is received at phone device 112 intended for user device 110. User 105 may answer the call using user device 110. As such, the call is received at phone device 112 and relayed, via Bluetooth communication, from phone device 112 to user device 110. User 105 may be notified that the call is received at phone device 112 and relayed to user 105 via Bluetooth connection. Thus, user 105 may use his or her own user device 110 to answer the call, even though the call is received at phone device 112.

By using the above process 300, an alternate phone located near an intended call receiver may be determined to receive a call for the intended call receiver, when the phone device of the intended call receiver is experiencing difficulty in receiving calls. In particular, the alternate phone may be determined based on re-routing settings, such as social and context information. Thus, a call may be re-routed to an appropriate alternate phone to connect the intended call receiver even when the intended call receiver is having difficulty connecting to the telephone network.

The following are exemplary scenarios in which the above processes 200 and 300 may be implemented.

EXAMPLE 1

Alice and Bob are at a party. Alice's mobile phone has weak wireless signal reception at the party while Bob's mobile phone has good signal reception at the party. Due to the weak wireless signal reception, Alice's mobile phone is not able to receive calls. Alice's mobile phone begins to discover phone devices near Alice using Bluetooth signals to find possible alternate phones that may receive phone calls on behalf of Alice.

Bob's mobile phone is found near Alice and is designated as an alternate phone for receiving phone calls on behalf of Alice. Alice is notified of Bob's mobile phone as a possible alternate phone for receiving calls for Alice. Alice's mobile phone inquires Alice whether Bob's mobile phone is allowed to receive calls for Alice. Alice agrees to let Bob's phone receive Alice's calls. Further, Bob's mobile phone inquires Bob whether Bob allows calls for Alice to be re-routed to Bob's mobile phone. Bob agrees to allow calls for Alice to be re-routed to Bob's mobile phone. Bob's mobile phone notifies the telecommunication service or the routing device of this re-routing arrangement. The arrangement may be determined by the system from rerouting settings associated with Bob's and/or Alice's mobile phones.

Mallory is attempting to call Alice. The telecommunication service receives the call request from Mallory. The telecommunication service notes that Alice's mobile phone is not reachable because it is not registered at any cellular towers. The telecommunication service notes Alice's mobile phone account allows calls for Alice to be re-routed to a list of phone devices. Further, as noted above, the telecommunication service determines that Bob's mobile phone is ready to serve as an alternate phone to receive calls for Alice. The service also determines that there are no restrictions from Alice or Bob preventing Mallory's call to be rerouted. Thus, telecommunication service forwards Mallory's call to Bob's mobile phone. In particular, telecommunication service may notify Mallory that Alice's mobile phone cannot be reached and the call is being forwarded to another mobile device located near Alice.

Bob's mobile phone receives the re-routed call from Mallory and notifies Bob that the call is intended for Alice. Bob is asked whether he agrees to receive the call and whether Alice is reachable by Bob. Alice is sitting next to Bob at the party. Thus, Bob agrees to receive the call and Bob hands his mobile phone to Alice. Thus, Mallory is able to reach Alice even when Alice's mobile phone has weak or no wireless signal reception.

EXAMPLE 2

Alice is at work. Although Alice's mobile phone has signal reception for receiving phone calls, Alice's mobile phone has weak signal reception which causes the phone calls to have bad call quality. Bob calls Alice's mobile phone at work. During the phone conversation, the call quality deteriorates. Thus, Alice decides to end the call and find an alternate phone to continue the call with Bob. Alice uses the mobile phone to request that the telecommunication service find an alternate phone to continue the call with Bob.

The telecommunication service receives the request and begins to look for possible alternate phones near Alice that may receive the call for Alice. The telecommunication service look up the call re-route allow list of Alice's phone account. Unfortunately, none of the phones on Alice's re-route allow list are located near Alice. Alice's re-routing settings allow second degree relation alternate phones to receive calls for Alice. Thus, the telecommunication service then continues to search among the re-route allow lists of the alternate phones in Alice's re-route allow list. For example, friends of Alice's friends are searched. The research found some phones located near Alice, including a landline office phone and a coworker's mobile phone located near Alice. The telecommunication service does not include Alice's manager's mobile phone, which is in Alice's re-route blocked list. The search result is presented to Alice. Alice decides to choose landline office phone as the alternate phone for continue the call. The telecommunication service receives Alice's selection and re-routes the call from Bob to the landline office phone. Thus, Alice and Bob may continue the phone call using Alice's landline work phone with better call connection quality.

EXAMPLE 3

Tina calls Alex's mobile phone. Unfortunately, Alex's mobile phone has no signal reception and is not able to receive phone calls. The telecommunication service determines that Alex's girlfriend's mobile phone is available to serve as an alternate phone to receive phone calls for Alex. Nevertheless, the telecommunication service determines, based on Alex's social network history, that Tina is Alex's ex-girlfriend. Thus, the telecommunication service automatically refrains from forwarding Tina's call to the mobile phone of Alex's current girlfriend. As such, Tina's call is forwarded to Alex's voice mail. Therefore, even if the restriction is not specifically set by Alex, the telecommunication service may determine that a call would not be appropriate to forward because, based on Alex's social network history, the call is from Alex's ex-girlfriend and that the user of the alternate phone is a current girlfriend of Alex.

Figure 4:
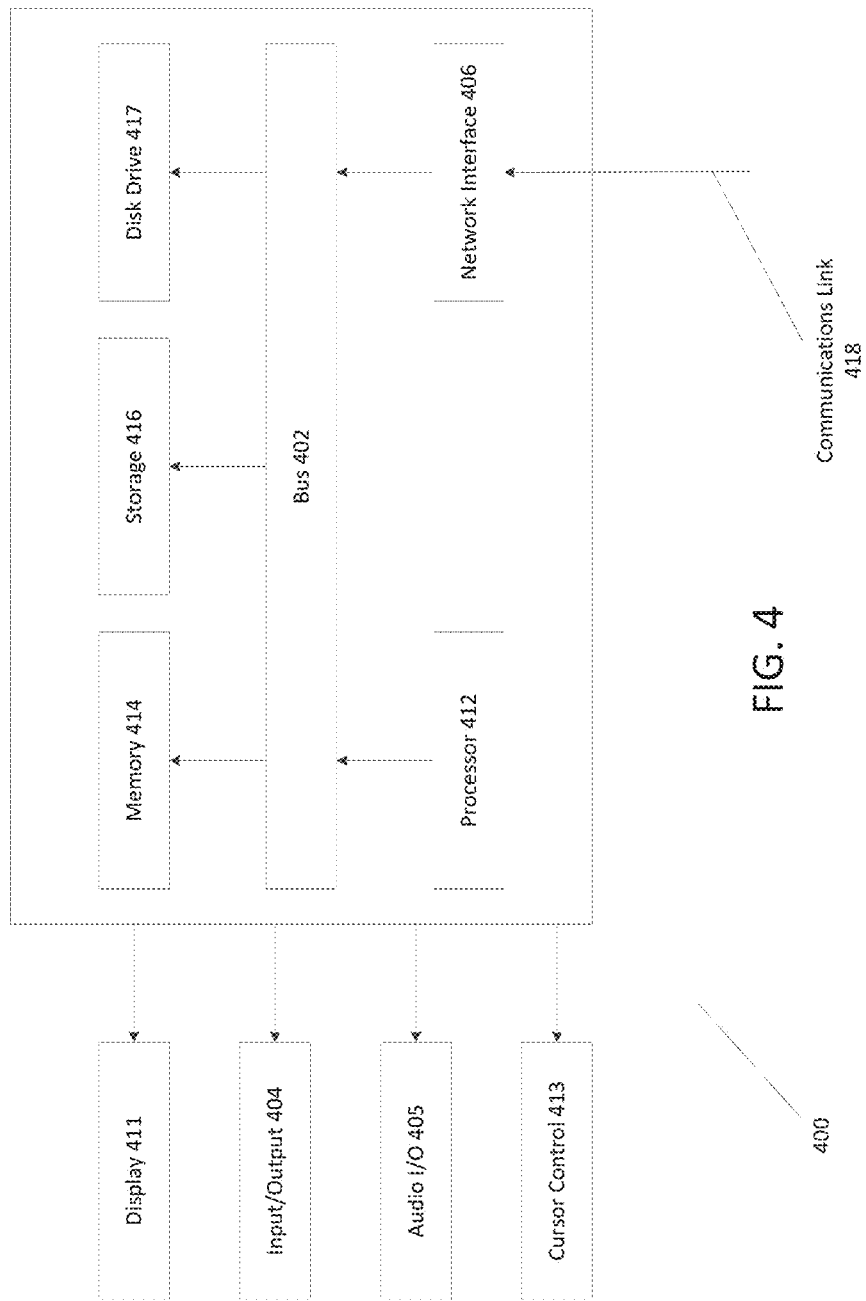
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with other communication devices and the network 160. The merchant and/or payment provider may utilize a network computing device (e.g., a network server) capable of communicating with other communication devices and the network 160. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory storing account information about a telephone account of a first user, and
    one or more hardware processors coupled to the non-transitory memory and configured to read instructions from the non-transitory memory to cause the system to perform operations comprising:
        detecting a call intended for a phone device of the first user;

in response to the detecting the call, determining whether communication with the first user via the phone device of the first user can be initiated;

in response to determining that the communication with the first user via the phone device cannot be initiated:
referencing a social media account of the user to identify one or more users that correspond to the first user;
determining that a location of a phone device of a second user of the one or more users is within a threshold distance of the phone device of the first user; and
in response to determining that the location of the phone device of the second user is within the threshold distance of the phone device of the first user, determining whether the phone device of the second user is on a block list associated with the first user;
in response to determining that the phone device of the second user is not on the block list, re-routing the call intended for the phone device of the first user to the phone device of the second user; and
communicating a message to the phone device of the second user notifying the second user that the call is intended for the second user.

2. The system of claim 1,
wherein the determining whether communication with the first user via the phone device of the first user can be initiated further comprises determining whether a signal reception strength of the phone device of the first user is below a threshold signal strength.

3. The system of claim 1,
wherein the account information of the telephone account of the first user comprises a re-route allow list of phone devices allowed to serve as alternate phones for receiving calls for the phone device of the first user; and
wherein the operations further comprise determining whether the phone device of the second user is on the re-route allow list.

4. The system of claim 3,
wherein the telephone account is associated with a social network account of the first user; and
wherein the re-route allow list of phone devices is derived from a friend list of the social network account.

5. The system of claim 1, wherein the operations further comprise:
determining that the re-routing the call to the phone device of the second user cannot be completed;
determining a phone device of a third user, wherein the third user has an affiliation with the second user and the third user is a location within the threshold distance of the phone device of the first user; and
re-routing the call intended for the phone device of the first user to the phone device of the third user.

6. The system of claim 1,
wherein the account information of the telephone account comprises a list of callers allowed to reach the first user by call re-routing; and
wherein the operations further comprise:
determining whether the call originated from a caller in the list of callers allowed to reach the first user by call re-routing.

7. The system of claim 1,
wherein the account information of the telephone account comprises a time-and-place condition under which calls are allowed to be re-routed to the first user; and
wherein the re-routing the call to the first user via a phone device of the second user is based on the time-and-place condition being satisfied.

8. The system of claim 1,
wherein the account information of the telephone account comprises a list of other phone devices that are allowed to use the phone device of the first user as an alternate phone for receiving calls on behalf of the other phone devices; and
wherein the operations further comprise:
receiving a call intended for another phone device;
determining a connection status of the another phone device;
determining that the phone device of the first user is located near the another phone device and that the another phone device is in the list of other phone devices allowed to use the phone device of the first user as an alternate phone; and
re-routing the call intended for the another phone device to the phone device of the first user.

9. The system of claim 1, wherein the message is a text message or an audio message.

10. The system of claim 1, wherein the message includes instructions to provide the phone device of the second user to the first user.

11. A method comprising:
detecting a call intended for a phone device of the first user;
in response to the detecting the call, determining whether the first user can be reached on the phone device of the first user;
in response to determining that the first user cannot be reached on the phone device of the first user:
referencing a contact list of the user to identify one or more users that correspond to the first user;
determining that a location of a phone device of a second user of the one or more users is within a threshold distance of the phone device of the first user; and
in response to determining that the location of the phone device of the second user is within the threshold distance of the phone device of the first user, determining whether the phone device of the second user is on a block list associated with the first user; and
in response to determining that the phone device of the second user is not on the block list, re-routing the call intended for the phone device of the first user to the phone device of the second user.

12. The method of claim 11,
wherein the determining whether the first user can be reached on the phone device of the first user further comprises determining whether a signal reception of the phone device of the first user is below a threshold signal strength.

13. The method of claim 11,
wherein an account information of the telephone account comprises a re-route allow list of phone devices allowed to serve as alternate phones for receiving calls for the phone device of the first user; and
wherein the method further comprises determining whether the phone device of the second user is on the re-route allow list.

14. The method of claim 13,
wherein the telephone account is associated with a social network account of the first user; and wherein the re-route allow list of phone devices is derived from a friend list of the social network account.

15. The method of claim 11,
wherein the method further comprises:
determining that the re-routing the call to the phone device of the second user cannot be completed;
determining a phone device of a third user wherein the third user has an affiliation with the second user and the third user is a location within the threshold distance of the phone device of the first user; and
re-routing the call intended for the phone device of the first user to the phone device of the third user.

16. The method of claim 11,
wherein the account information of the telephone account comprises a list of callers allowed to reach the first user by call re-routing; and
wherein the operations further comprise:
determining whether the call originated from a caller in the list of callers allowed to reach the first user by call re-routing.

17. The method of claim 11,
wherein an account information of the telephone account comprises a time-and-place condition under which calls are allowed to be re-routed to the first user; and
wherein the re-routing the call to the first user via a phone device of the second user is based on the time-and-place condition being satisfied.

18. The method of claim 11,
wherein the account information of the telephone account comprises a list of other phone devices that are allowed to use the phone device of the first user as an alternate phone for receiving calls on behalf of the other phone devices; and
wherein the operations further comprise:
receiving a call intended for another phone device;
determining a connection status of the another phone device;
determining that the phone device of the first user is located near the another phone device and that the another phone device is in the list of other phone devices allowed to use the phone device of the first user as an alternate phone; and
re-routing the call intended for the another phone device to the phone device of the first user.

19. A non-transitory machine-readable medium having stored thereon machine-readable instructions executable to cause a machine to perform operations comprising:
detecting a call intended for a phone device of the first user;
in response to the detecting the call, determining whether communication with the first user via the phone device of the first user can be initiated;
in response to determining that the communication with the first user via the phone device cannot be initiated:
referencing a social media contact list of the user to identify one or more users that correspond to the first user;
determining that a location of a phone device of a second user of the one or more users is within a threshold distance of the phone device of the first user; and
in response to determining that the location of the phone device of the second user is within the threshold distance of the phone device of the first user, determining whether the phone device of the second user is on a block list associated with the first user;
in response to determining that the phone device of the second user is not on the block list, re-routing the call intended for the phone device of the first user to the phone device of the second user; and
communicating a message to the phone device of the second user notifying the second user that the call is intended for the second user.

20. The non-transitory machine-readable medium of claim 19, wherein an account information of the telephone account of the first user comprises a re-route allow list of phone devices allowed to serve as alternate phones for receiving calls for the phone device of the first user; and
wherein the operations further comprise determining whether the phone device of the second user is on the re-route allow list.

21. The non-transitory machine-readable medium of claim 19, wherein the operations further comprise:
determining that the re-routing the call to the phone device of the second user cannot be completed;
determining a phone device of a third user, wherein the third user has an affiliation with the second user and the third user is a location within the threshold distance of the phone device of the first user; and
re-routing the call intended for the phone device of the first user to the phone device of the third user.

22. The non-transitory machine-readable medium of claim 19, wherein an account information of the telephone account comprises a list of other phone devices that are allowed to use the phone device of the first user as an alternate phone for receiving calls on behalf of the other phone devices; and
wherein the operations further comprise:
receiving a call intended for another phone device;
determining a connection status of the another phone device;
determining that the phone device of the first user is located near the another phone device and that the another phone device is in the list of other phone devices allowed to use the phone device of the first user as an alternate phone; and
re-routing the call intended for the another phone device to the phone device of the first user.

* * * * *